United States Patent [19]

Thelen

[11] Patent Number: 4,491,348

[45] Date of Patent: Jan. 1, 1985

[54] VIBRATION ATTENUATING COUPLING

[75] Inventor: William G. Thelen, Onondaga, Mich.

[73] Assignee: Aeroquip Corporation, Jackson, Mich.

[21] Appl. No.: 435,554

[22] Filed: Oct. 21, 1982

[51] Int. Cl.³ .............................................. F16L 55/02
[52] U.S. Cl. ..................................... 285/49; 285/234; 285/263; 285/DIG. 1
[58] Field of Search ................. 285/167, 49, 263, 234, 285/DIG. 1

[56] References Cited

U.S. PATENT DOCUMENTS

| | | | |
|---|---|---|---|
| 1,906,826 | 5/1933 | Smith et al. | 285/DIG. 7 |
| 3,390,899 | 7/1968 | Herbert et al. | 285/45 |
| 3,680,895 | 8/1972 | Herbert et al. | 285/167 |
| 3,734,546 | 5/1973 | Herbert et al. | 285/49 |
| 3,853,337 | 12/1974 | Herbert et al. | 285/49 |
| 4,068,864 | 1/1978 | Herbert et al. | 285/49 |
| 4,076,284 | 2/1978 | Herbert et al. | 285/263 |
| 4,098,527 | 7/1978 | Herbert et al. | 285/167 |
| 4,103,939 | 8/1978 | Herbert et al. | 285/137 |
| 4,198,078 | 4/1980 | Herbert et al. | 285/49 |
| 4,236,737 | 12/1980 | Herbert et al. | 285/234 |

Primary Examiner—Dave W. Arola
Attorney, Agent, or Firm—Beaman & Beaman

[57] ABSTRACT

The invention pertains to a vibration attenuating fluid coupling characterized by its ability to soundproof fluid conduit systems and permit limited misalignment between interconnected conduits without leakage. In particular, the structure of the invention may be utilized with existing couplings and fluid systems with minor modification. The coupling comprises a housing receiving the inner end of a nipple which supports a flange. An annular elastomeric ring within the housing imposes an axial force upon the nipple, and an inner bearing complimentary in configuration to existing housing surfaces and oriented therein by such surfaces is engaged by the nipple inner end and includes an elastomeric material wherein elastic material, alone, supports the nipple relative to the housing for absorbing vibrations and permitting misalignment.

3 Claims, 4 Drawing Figures

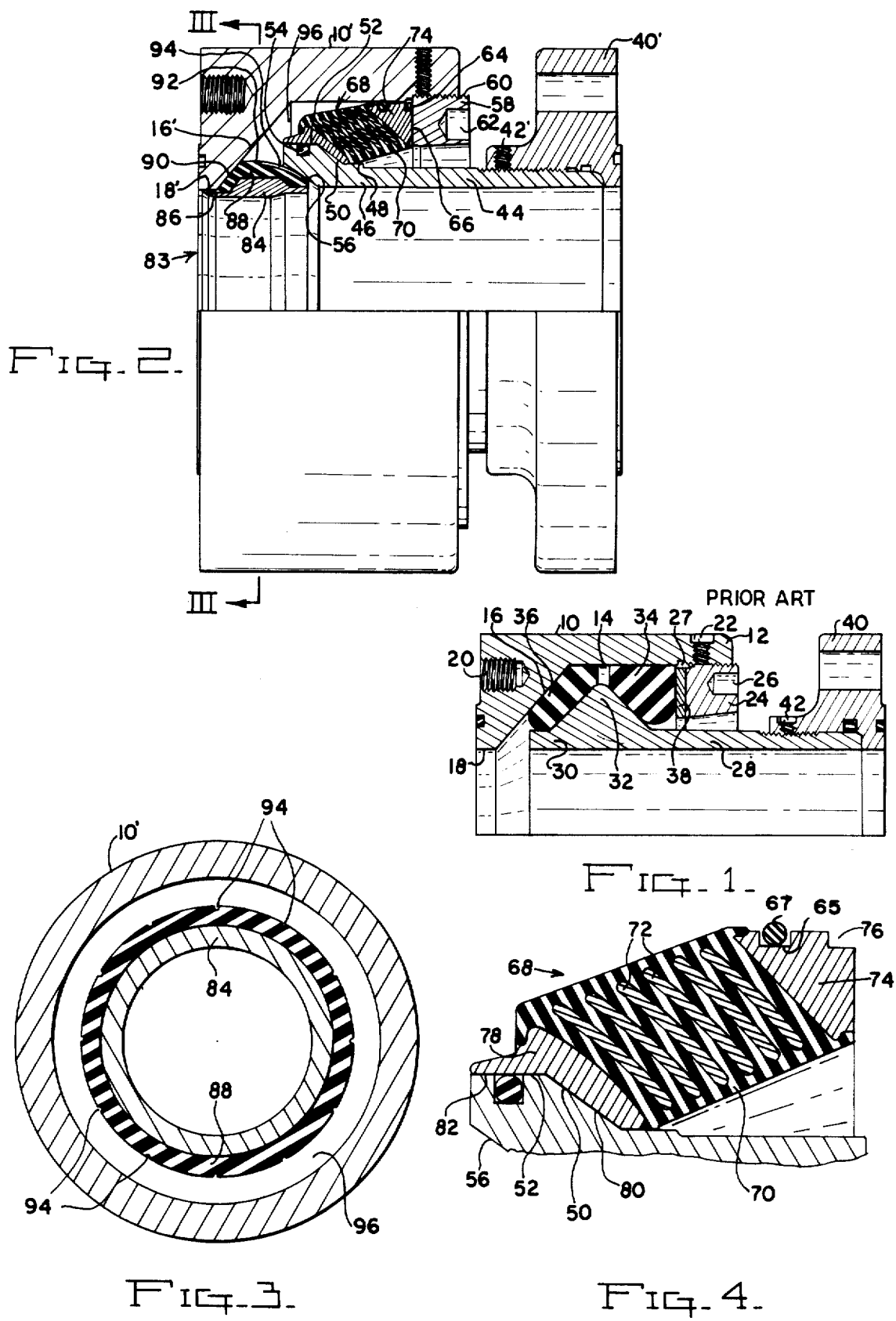

4,491,348

VIBRATION ATTENUATING COUPLING

BACKGROUND OF THE INVENTION

Fluid couplings capable of interconnecting conduits in a manner wherein vibrations within the conduits are absorbed or damped are commonly used in those applications wherein the sound generated by fluid flow, conduit expansion and other vibration producing origins is objectionable. For instance, submarines and other warships widely employ vibration attenuating couplings to minimize the likelihood of detection. Further, it is advantageous to utilize couplings in a conduit system capable of accommodating conduit misalignment, and conduits having limited flexibility for alignment or vibration attenuating purposes are highly desirable.

Flexible and vibration attenuating couplings are known wherein elastomeric elements are used between the coupling components for vibration absorbing purposes. For instance, the United States Navy utilizes rubber insert sound isolation couplings on warships to provide piping flexibility and sound vibration absorption and other couplings employed annular elastomer gaskets intermediate a coupling housing and nipple wherein the gaskets were placed under compression by a nut threaded into the housing. Further, flexible pipe connections of the aforementioned type are shown in U.S. Pat. Nos. 3,390,889; 3,734,546; 3,853,337; 4,068,864 and 4,076,284.

In the patents listed above it is known to interconnect major coupling components by the use of an elastomeric outer bearing interposed between a housing and nipple wherein ends of the outer bearing are bonded to collars, one of the collars being attached to housing structure while the other collar engages the coupling nipple. Also, these patents disclose arrangements wherein inner bearing structure supports the nipple relative to the housing at a location remote from the outer bearing. Such known constructions absorb sound producing vibrations as well as provide a limited degree of flexibility between interconnected conduits.

Couplings employing an elastomeric outer bearing having bonded collars and an inner bearing are superior in vibration absorbing characteristics, flexibility accommodation and longevity to couplings employing elastomeric gaskets under compression. However, as gasket type couplings have long been used it is impractical from a cost standpoint to replace such couplings in their entirety with elastomeric outer and inner bearing type couplings, and it is an object of the invention to provide a vibration absorbing coupling construction wherein major existing coupling components may be utilized to minimize the cost of conversion and retrofit of such gasket type couplings to couplings employing outer and inner elastomeric bearings.

Another object of the invention is to provide a vibration attenuating fluid coupling wherein an existing coupling housing may be utilized without modification and only nipple and elastomeric components need be substituted to convert gasket type couplings to the bearing type.

Yet another object of the invention is to provide vibration attenuating coupling structure capable of converting a gasket type coupling to an inner and outer bearing type coupling wherein no machining of the existing coupling housing is required, and wherein the inner bearing cooperates with existing housing surfaces to maintain the inner bearing in location.

In the practice of the invention an existing gasket type coupling is disassembled, and the gaskets and nipple are replaced with inner and outer bearings and a nipple constructed in accord with the invention. An inner bearing of annular configuration is located within the housing and includes axial and radially extending surfaces complimentary in configuration and dimension to similar existing surfaces within the housing, and in this manner the inner bearing is accurately located and positioned within the coupling housing.

The inner bearing consists of a metallic ring exteriorly provided with an elastomeric material, the elastomer engaging the housing surfaces, and includes a convex surface having passages defined therein wherein the convex surface engages a bearing surface defined upon the nipple.

An outer bearing assembly consisting of an elastomeric ring internally reinforced by embedded metal rings includes metallic collars bonded thereto at each end of the elastomeric ring. One of these collars engages a nut threaded upon the coupling housing, while the other collar engages an oblique surface defined upon the inner end of the nipple.

Rotation of the nut causes the outer bearing to displace the nipple into engagement with the inner bearing, and the inner end of the nipple is thereby supported within the housing solely upon elastomeric material. The nipple includes an outer end extending from the housing, and a flange mounted upon the nipple outer end is of such configuration as to be attached to a conventional conduit. In this manner the coupling structure permits flexibility between the housing and nipple, and as the nipple is resiliently supported within the housing upon elastomeric material vibrations will not be transferred therebetween.

BRIEF DESCRIPTION OF THE DRAWINGS

The aforementioned objects and advantages of the invention will be appreciated from the following description and accompanying drawings wherein:

FIG. 1 is a partial sectional view of a prior art vibration attenuating coupling before modification in accord with the inventive concept, FIG. 2 is an elevation view, the upper half constituting a diametrical section, of a coupling in accord with the invention, FIG. 3 is an elevational sectional view taken along Section III—III of FIG. 2, and FIG. 4 is an enlarged, detail, elevational sectional view of the elastomeric ring assembly.

DESCRIPTION OF THE PREFERRED EMBODIMENT

A conventional vibration attenuating coupling of the type presently used upon United States warships and of the type being improved and modified by the inventive concepts is illustrated in FIG. 1. This coupling includes an annular housing 10 having an internally threaded access end 12, and internally, the housing passage includes a cylindrical portion 14, an oblique or conical surface 16, and a cylindrical inner minimum diameter 18. The housing is provided with a plurality of circumferentially spaced threaded holes 20 whereby a conduit fitting, such as a flange, not shown, may be attached to the housing for mounting the housing upon rigid conduit, or other fluid conducting system component. A locking set screw 22 is threaded within the housing for tightening against the annular nut 24. The nut 24 includes spanner wrench openings 26 for tightening or removing the nut. Also, an annular groove 27 is often formed in the housing.

The coupling includes a tubular nipple 28 having an inner end 30 located within the housing 10 and an annular projection 32 is located intermediate a pair of annular rubber gaskets 34 and 36. The gaskets are compressed by the nut 24 bearing against washer 38, and the gasket 34 will force the nipple 28 to the left, FIG. 1, to compress gasket 36 and thereby resiliently support the nipple within the housing. A flange 40 is mounted upon the outer end of the nipple 28 by threads and lock screw 42 fixes the flange to the nipple wherein the flange permits a conduit or other component of the conduit system to be attached to the nipple.

It will be appreciated that in the coupling of FIG. 1 the interconnection between the housing 10 and nipple 28 is solely through the elastomeric gaskets 34 and 36, and accordingly, the elastomeric material of the gaskets will absorb vibrations preventing transmission thereof between the housing and nipple, and the gaskets will also permit the accommodation of limited misalignment between the axes of the housing and nipple and still maintain a fluid tight interconnection therebetween.

Couplings constructed as shown in FIG. 1 have not proven to be as dependable in operation as desired, the gaskets 34 and 36, may fail due to the stresses and forces thereon over a significant duration. The gaskets are placed within tension/compression relationships and the coupling is unable to accommodate significant misalignment or motion without leakage. Further, this type of coupling construction does not product as effective sound attenuation as desired, and its rotational stiffness is affected by the pressure of the medium being conveyed, i.e. at design pressure it is much more rigid than at low pressures.

The prior art coupling shown in FIG. 1 is upgraded by the utilization of the inventive concepts, and such an improved coupling is illustrated in FIG. 2. In FIG. 2 the housing 10' is identical to that of FIG. 1, and to upgrade the gasket type coupling it is not necessary that the housing be removed from its associated fluid coupling component.

The coupling of FIG. 2 utilizes a tubular nipple 44 externally threaded at its outer end for receiving the coupling flange 40', which may be that salvaged from the prior art coupling being upgraded. The nipple 44 includes an inner end 46 having a stepped cylindrical surface 48, a conical surface 50, and a cylindrical surface 52. The nipple inner end is grooved to receive a conventional O-ring seal 54. Further, the nipple includes an inner bearing surface 56 of conical configuration converging toward the right, FIG. 2.

The annular nut 58 is threaded into the housing threads 60 and includes the usual spanner holes 62. Internally, the nut includes an axially extending rib 64, and flat radial surface 66.

The outer bearing assembly 68 includes an annular ring 70 of the elastomeric material, such as a rubber compound, and preferably, reinforcing metal rings 72 are embedded within the elastomer to stiffen the ring. The outer end of the elastomer is bonded to an annular metal collar 74, which includes a radial surface adapted to engage the nut surface 66, a recess 76 receiving the nut rib 64, and a groove 65 receiving O-ring 67.

The inner end of the elastomer ring 70 is bonded to the annular metal collar 78, which includes a conical surface 80 engaging the nipple surface 50, and a cylindrical surface 82 which engages nipple surface 52 and is sealed thereto by the O-ring 54.

An inner bearing 83 is located within the housing 10', and includes an annular metal ring 84 of a cross sectional configuration which will be apparent from FIG. 2, such configuration including an axially extending cylindrical lip 86 which is closely received within the housing surface 18'.

An elastic material 88 is bonded to the exterior surface of the ring 84, and the elastomer includes a surface 90 which engages the housing surface 16'. Also, the elastomer includes a convex surface 92 having a plurality of slots or passages 94 defined therein. The surface 92 engages the nipple bearing surface 56, and the passages 92 prevent a fluid tight seal from existing between the inner bearing surface and the nipple.

Assembly of the coupling in accord with the invention is readily achieved by first inserting the inner bearing 83 such that the lip 86 is received within the housing surface 18'. Thereupon, the nipple 44, with the outer bearing assembly 68 and nut 58 being preliminarily placed thereon, is inserted into the housing until the bearing surface 56 engages the convex surface 92 of the elastomeric material 88. The outer bearing 68 is then positioned as shown in FIG. 2, and the nut 58 is threaded into housing threads 60 such that the components will be assembled as shown in FIG. 2. The flange 40' is then mounted upon the outer end of the nipple and locked thereon by set screw 42'.

Tightening of the nut 58 forces the outer bearing assembly 68 to the left forcing the nipple 44 in a like direction into firm engagement with the inner bearing 83. The inner bearing will axially position the nipple within the housing, and as only the elastomeric material of inner bearing 83 is engaging the nipple bearing surface 56, and as the entire support of the inner collar 78 is through the elastomer of ring 70, the interconnection between the housing 10' and nipple 44 is solely through elastomeric material thereby preventing vibrations from being transmitted between the housing and nipple and achieving the desired attenuation and damping.

The resilient nature of the ring assembly 68 in conjunction with the convex configuration of the elastomer surface 92 permits misalignment between the axes of the housing 10' and nipple 44 to be readily accommodated, yet the O-ring sealing between the nipple and outer bearing assembly, and the outer bearing assembly and the housing, prevents leakage even though significant misalignment may exist. The presence of the slots 94 on the elastomer 88 prevent high fluid pressures from being "trapped" within the housing chamber 96 after the pressure within the nipple has been reduced, and the use of the slots will permit equal pressures to exist on the inner and outer sides of the inner bearing at all times.

The inner bearing 83 is oriented to the housing 10' by the lip 86 and housing surface 16' and it will be readily appreciated that couplings of the prior art type shown in FIG. 1 may be readily upgraded by utilizing the nipple, nut and inner and outer bearings shown in FIG. 2 without requiring modification to the housing 10 or flange 40.

It is appreciated that various modifications to the inventive concepts may be apparent to those skilled in the art without departing from the spirit and scope of the invention.

What is claimed is:

1. In a vibration attenuating coupling having an annular housing having an internally threaded access end, an annular threaded compression nut mating with the threads of the access end, a radially and axially extending compression surface in opposed axial alignment with the nut intersecting an axially extending cylindrical passage surface, a tubular nipple having an inner end within the housing and an outer end having a conduit mounting flange mounted thereon, an annular elastomeric support interposed between the housing and nipple inner end elastically supporting the nipple relative to the housing, the improvement comprising, said nipple inner end having an annular inner bearing surface, an annular, removable inner elastomeric bearing comprising a metal ring having an outer surface, an elastomer mounted upon said ring outer surface, said elastomer including radial and axially extending surfaces complementary to the housing compression and passage surfaces for engagement therewith positioning the inner bearing upon the housing, the annular elastomeric support comprising an annular elastomeric outer bearing interposed between the nut and nipple inner end elastically supporting the nipple inner end and axially biasing the nipple toward the housing compression surface compressing said inner bearing between said nipple bearing surface and the housing compression surface.

2. In a vibration attenuating coupling as in claim 1, said nipple bearing surface being of a substantially conical configuration and said elastomer having a convex configuration.

3. In a vibration attenuating coupling as in claim 2, at least one passage defined in said elastomer convex surface defining a fluid conducting passage between said nipple bearing surface and said inner bearing.

* * * * *